(12) United States Patent
Villey

(10) Patent No.: US 7,801,714 B2
(45) Date of Patent: Sep. 21, 2010

(54) FLIGHT SIMULATOR ADAPTED FOR A FAMILY OF AIRCRAFT

(75) Inventor: Philippe Villey, Leguevin (FR)

(73) Assignee: Airbus France, Toulouse (FR)

( * ) Notice: Subject to any disclaimer, the term of this patent is extended or adjusted under 35 U.S.C. 154(b) by 2072 days.

(21) Appl. No.: 10/126,975

(22) Filed: Apr. 22, 2002

(65) Prior Publication Data

US 2002/0155413 A1 Oct. 24, 2002

(30) Foreign Application Priority Data

Apr. 23, 2001 (FR) .................................. 01 05431

(51) Int. Cl.
*G06G 7/48* (2006.01)
(52) U.S. Cl. .............................................. 703/8; 703/7
(58) Field of Classification Search .................... 434/37, 434/28–38; 703/7–8, 708
See application file for complete search history.

(56) References Cited

U.S. PATENT DOCUMENTS

| | | | | | |
|---|---|---|---|---|---|
| 3,886,334 | A | * | 5/1975 | Cummings et al. | 434/30 |
| 5,017,141 | A | * | 5/1991 | Relf et al. | 434/29 |
| 5,023,791 | A | * | 6/1991 | Herzberg et al. | 701/35 |
| 5,240,416 | A | * | 8/1993 | Bennington | 434/30 |
| 5,270,931 | A | * | 12/1993 | Appleford | 701/3 |
| 5,410,941 | A | * | 5/1995 | Hotta et al. | 84/601 |
| 5,435,725 | A | * | 7/1995 | Ikeuchi | 434/30 |
| 5,559,956 | A | * | 9/1996 | Sukegawa | 714/8 |
| 5,583,844 | A | * | 12/1996 | Wolf et al. | 701/1 |
| 5,711,672 | A | * | 1/1998 | Redford et al. | 434/307 R |
| 5,807,109 | A | * | 9/1998 | Tzidon et al. | 434/35 |
| 6,038,635 | A | * | 3/2000 | Ideta | 711/103 |
| 6,053,737 | A | * | 4/2000 | Babbitt et al. | 434/30 |
| 6,077,077 | A | * | 6/2000 | Geipe | 434/30 |
| 6,106,298 | A | * | 8/2000 | Pollak | 434/29 |
| 6,109,920 | A | * | 8/2000 | Shih et al. | 434/37 |
| 6,149,435 | A | * | 11/2000 | Park et al. | 434/30 |
| 6,175,891 | B1 | * | 1/2001 | Norman et al. | 711/5 |
| 6,195,626 | B1 | * | 2/2001 | Stone | 703/8 |
| 6,319,008 | B1 | * | 11/2001 | Mickelson et al. | 434/29 |
| 6,553,333 | B1 | * | 4/2003 | Shenk | 702/182 |
| 6,564,241 | B1 | * | 5/2003 | Rosengard | 718/107 |
| 6,659,871 | B2 | * | 12/2003 | Leifer et al. | 463/39 |

(Continued)

OTHER PUBLICATIONS

Rymaszewski, Michael. "Microsoft Combat Flight Simulator 2: WWII Pacific Theater Sybex Official Strategies & Secrets, Chapter 4: Friends & Foes." SYBEX Inc., 2000.*

(Continued)

*Primary Examiner*—Kamini S Shah
*Assistant Examiner*—Akash Saxena
(74) *Attorney, Agent, or Firm*—Dickinson Wright PLLC

(57) ABSTRACT

A flight simulator adapted for a family of aircraft may include a computer having a hardware unit common to the family of aircraft and capable of carrying out a function by implementing a software program that is supported by a nonvolatile memory of a module. The module is electrically and mechanically connected in a removable manner to the hardware unit and has a plurality of independent memories. Each of the memories stores a specific software program for implementing the function related to a given type of aircraft. A controllable component of the module may select, when the module is connected to the hardware unit, one of the memories whose software program is then implemented by the hardware unit.

2 Claims, 2 Drawing Sheets

U.S. PATENT DOCUMENTS

| | | | |
|---|---|---|---|
| 7,073,014 B1* | 7/2006 | Roohparvar | 711/103 |
| 7,085,722 B2* | 8/2006 | Luisi | 704/275 |
| 7,236,914 B1* | 6/2007 | Zyskowski | 703/8 |
| 2004/0189671 A1* | 9/2004 | Masne | 345/619 |

OTHER PUBLICATIONS

"Aviation Recorders Background" published online by L3, 1998. www.l-3ar.com.*

George, Gary R. et al. "The Army Aviation Collective Traning Solution: AVCATT-A." 2000 L3 Communications.*

Flight Link, Inc. Driver Download. http://www.flightlink.com/support. Dec. 2001.*

Wayback Machine Llist of Flight Simulator models Feb. 22, 1999 http://web.archive.org/web/19990222060222/http://ourworld.compuserve.com/homepages/cranenburgh/fs98plan.htm.*

Paper Index from L3 Communication from Nov. 2001.*

Wikipedia Definition of "Flash Memory" http://en.wikipedia.org/wiki/Flash_memory $20^{th}$ Aug. 2007.*

Microsoft Flight Simulator 2000 Pilot's Handbook; 1993-1999; p. 1-244.*

* cited by examiner

FLIGHT SIMULATOR ADAPTED FOR A FAMILY OF AIRCRAFT

FIELD OF THE INVENTION

The present invention relates to a flight simulator adapted for a family of aircraft.

BACKGROUND OF THE RELATED ART

Within the scope of the present invention, the term "family of aircraft" refers to a set of aircraft of different types, but comprising equipment, for example computers, which are identical for all the aircraft of the family.

It is known that flight simulators, in particular those intended for training pilots, require a high level of realism and for this purpose comprise equipment, especially computing equipment, identical to that existing on the aircraft, whose operation it simulates.

Computing equipment of this sort mounted on a flight simulator and adapted for an entire family of aircraft comprises, in a known manner, a hardware unit which is common to said aircraft of said family and which is capable of carrying out at least one particular function, such as controlling cathode-ray tube displays on the instrument panel, for example, by implementing a suitable software program.

This software program, which is generally supported by a nonvolatile memory of a module removably connected to said hardware unit, is specific and exclusive to a given type of aircraft from said family.

Consequently, there are as many different modules each comprising an appropriate software program as there are different types of aircraft in the family in question.

Thus, in order to pass from a simulation mode relating to one type of aircraft (A330 for example) to a simulation mode relating to another type (A340, for example) of the same family, it is necessary to manually replace all the modules carrying specific software programs in the various computers of the simulator used.

To this end, by way of example, it will be noted that the civil transport aircraft of the A330/A340 type are each equipped with three DMC (Display Management Computer) computers intended to control the cathode-ray tube displays of the instrument panel, each of said DMC computers comprising two different modules, which involve replacing six modules on the flight simulator, for controlling said displays alone, when changing the simulation mode.

Such an operation of manually replacing a module, generally by unplugging and plugging, is restrictive, tricky to implement and expensive in terms of time.

In addition, the repetition of such operations, on each change of simulation mode, is a source of wear, in particular of the connection means provided on the hardware unit of the computer and/or on the modules.

SUMMARY OF THE INVENTION

The object of the present invention is to overcome these drawbacks. It relates to a flight simulator adapted for a family of aircraft, in particular civil transport aircraft, and especially allowing a simplified and less expensive change of simulation mode.

To this end, said flight simulator of the type adapted for a family of aircraft and comprising at least one computer which comprises a hardware unit common to said aircraft of said family and capable of carrying out at least one function by implementing a software program which is supported by a nonvolatile memory of a module, said module being removably connected to said hardware unit, is remarkable in that said module comprises:

a plurality of independent memories, each one of which comprises a specific software program making it possible to implement said function for a given type of aircraft from said family of aircraft; and controllable means making it possible to select, when said module is connected to said hardware unit, one of said memories, whose software program is then implemented by said hardware unit.

Thus, by virtue of the invention, said software program support module is common to the entire family of aircraft.

Consequently, it is no longer necessary:

to provide as many modules as there are different types of aircraft, the module according to the invention carrying out on its own all the functions carried out by a family of standard modules; and to manually replace the module or modules when changing simulation mode, a single memory selection being sufficient, which makes it possible to overcome the aforementioned drawbacks (restriction, wear, cost, etc.) due to the manual operations which are normally necessary.

Moreover, in an advantageous and simplified manner, said means for selecting one of said memories are controllable by a signal emitted by said hardware unit.

Furthermore, advantageously, each of said memories of the module supporting a software program is electronically erasable and programmable, which makes it possible for the software programs to be easily updated and therefore avoids having to replace the module when it is necessary to modify a software program, thus reducing the development costs of software modifications.

Moreover, for the purpose of protection, said module advantageously comprises locking means preventing a change of memory selection without cutting off the power supply, that is in general without shutting down the simulator.

However, according to the invention, said locking means are capable of being inhibited on receiving an appropriate signal. This is especially useful when reprogramming the various software programs and avoids having to break the power supply when moving from programming or reprogramming a software program to that of another of the same module.

BRIEF DESCRIPTION OF THE DRAWINGS

The figures of the appended drawing will make it clearly understood how the invention can be carried out. In these figures, identical references denote similar elements.

DETAILED DESCRIPTION OF EMBODIMENT EXAMPLES

Figure 1:
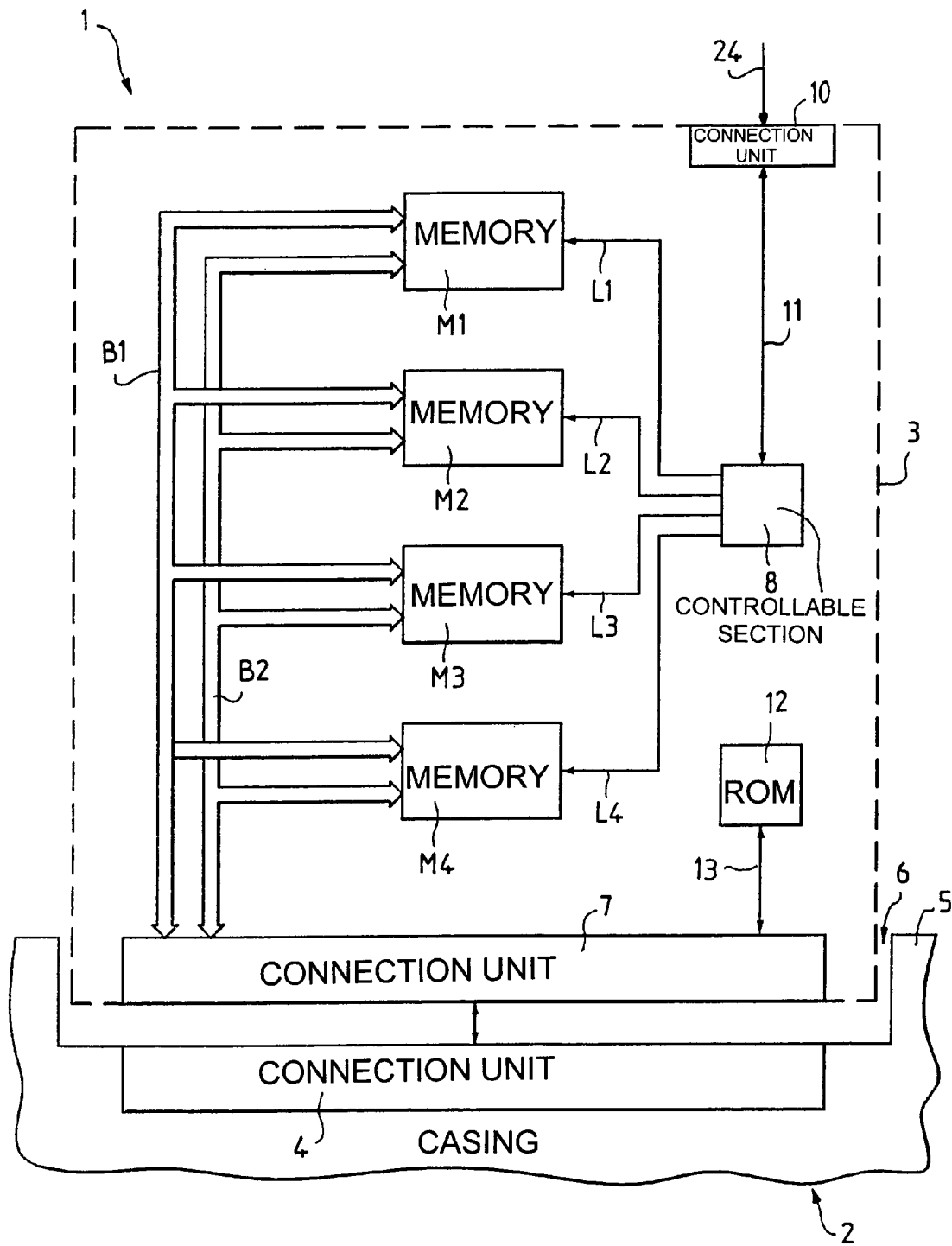
FIG. 1 shows schematically a module carrying a software program of a flight simulator according to the invention.

The flight simulator 1 according to the invention and partly shown in FIG. 1 is adapted for a family of aircraft, in particular civil transport aircraft.

To this end, said flight simulator 1 is of the type comprising at least one computer which comprises:

a hardware unit 2 common to said aircraft of said family and capable of carrying out at least one function, for example controlling an element (not shown) of said aircraft, by implementing a software program which is supported by a nonvolatile memory of a module 3; and said module 3 which is electrically and mechanically connected, in a removable manner, to said hardware unit 2.

Said hardware unit 2 comprises, inter alia, a central processing unit (not shown) and connection means 4, together with a casing 5 defining a housing 6 into which said module 3, also surrounded with a rigid casing, may be inserted either partly or completely.

When said module 3 is fitted to the bottom of the housing 6, the connection means 4 cooperate with connection means 7 of the module 3 such that said parts 2 and 3 are then electrically and mechanically connected. Of course, said module 3 may be extracted, by pulling, out of the housing 6, so that then the two parts 2 and 3 are independent of each other.

According to the invention, said module 3 comprises:

a plurality of independent memories M1, M2, M3, M4, each one of which comprises a specific software program making it possible to implement the aforementioned function for a given type of aircraft exclusively from said family of aircraft; and controllable means 8 making it possible to select, when said module 3 is connected to said hardware unit 2, one of said memories M1 to M4, whose software program is then implemented by said hardware unit 2.

The memories M1 to M4, which for example have a capacity of 2 Mb, are nonvolatile memories so that their content is not lost, should the power supply of the computer be cut off.

One of said memories M1 to M4, which is selected by the means 8, is activated by transmitting a signal via a link L1, L2, L3 or L4.

As can be seen in FIG. 1, said memories M1 to M4 are also connected by a common address bus transmission link B1 and by a common data bus transmission link B2 to said connection means 7.

Consequently, when the module 3 is connected, mechanically and electrically, to the hardware unit 2, the flight simulator 1 may implement, especially by virtue of the cooperation of the connection means 4 and 7, the software program supported by the memory M1, M2, M3 or M4 which was selected and which therefore corresponds to a given type of aircraft of the aforementioned family.

Thus, by virtue of the invention, when it is desired to modify the simulation mode, that is to say to carry out the simulation for another type of aircraft, it is no longer necessary to manually replace the entire module 3 as is the case for the standard type simulators, but it is enough simply to select another memory, that is one which supports the appropriate software program in the new simulation mode envisioned.

This makes it possible to avoid handling operations which are restrictive, often tricky to implement, sources of wear particularly at the connection means and expensive in terms of time.

Of course, the module 3 is subject to the movements possibly generated by the simulator 1. Also, in order to be able to withstand the mechanical stresses linked with such movements, the casing of the module 3 is mechanically protected, for example by two rigid plastic half-shells.

In addition, the module 3 comprises second connection means 10 which are capable of being connected (preferably with locking by means of screws) to cooperating connection means (not shown) provided on the hardware unit 2.

A control signal may be transmitted from the simulator 1 to the selection means 8 via said connection means 10 and a link 11, in order to control memory selection.

This control or selection signal preferably comprises two identical digital signals.

According to the invention, for reasons of security, after a software program is selected during initialization of the simulator 1, it is no longer possible, because of locking means, to change the software program without cutting off the power supply, that is to say without shutting down the simulator 1.

To do this, according to the invention, the module 3 records, for example using means 8, the state of the selection signal received on starting up the computer (and therefore the module 3) and locks this configuration, before the hardware unit 2 carries out a first reading of the memory selected, via a processor provided for this purpose, so that any subsequent change in the state of the selection signal has no effect.

Furthermore, it will be noted that:

the electrical power supply for the module 3 is provided by the hardware unit 2 via cooperating connection means 4 and 7; and the module 3 also comprises a serial read-only memory 12 connected by a link 13 to the connection means 7.

Moreover, each of the memories M1 to M4 of the module 3, supporting a software program, is electrically erasable and programmable, which makes it possible to adapt the module 3 easily to any modification or any replacement of software.

Figure 2:
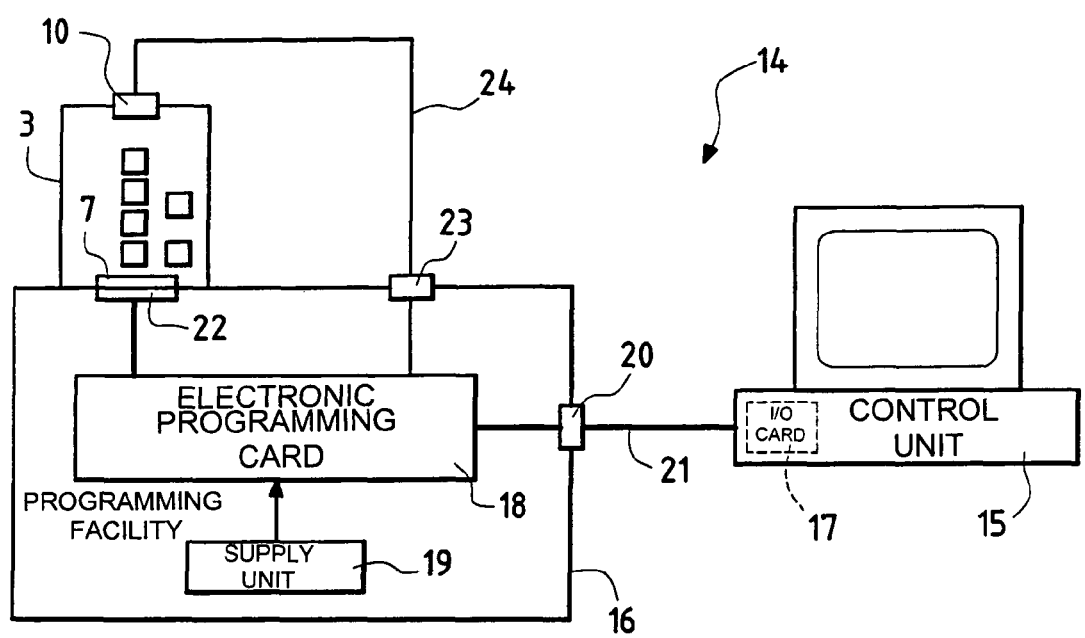
FIG. 2 illustrates schematically a programming bench for programming a module according to the invention.

To this end, in order to modify or replace at least one of the software programs supported by the memories M1 to M4, a programming bench 14, shown schematically in FIG. 2, is preferably used.

According to the invention, this programming bench 14 comprises:

a control unit 15 of the personal computer type, comprising a user interface and an electric interface associated with a programming facility 16 via a standard discrete input/output card 17; and said programming facility 16 comprising an electronic programming card 18, supply means 19 and a support (not shown) to accommodate the module 3 to be programmed or reprogrammed.

In addition, said programming facility 16 is connected to:

said control unit 15, via a connector 20 associated with a shielded cable 21; and said module 3, via, on the one hand, connection means 22 cooperating with connection means 7 and, on the other hand, connection means 23 linked to connection means 10 by a control cable 24.

According to the invention, the electronic card 18 comprises:

memory management resources M1 to M4 (write, read and erase algorithms);

serial read-only memory management resources 12 (write, read and erase algorithms);

the logic interface for interpreting commands from the unit 15 (write, read, erase and select commands from memories M1 to M4); and the management interface for exchanges between the unit 15 and the programming facility 16. This interface groups together the specific logic lines which signal that an item of data is ready to be transmitted or that an item of data has correctly been taken into account.

It will also be noted that, in order for the programming to go from the software program supported by one of said memories M1 to M4 to that supported by another memory, the aforementioned locking means are inhibited via a suitable signal emitted by the programming bench 14.

The module 3 according to the invention may therefore be subjected either to an operational simulation process as shown in FIG. 1, or to a programming process as shown in FIG. 2.

According to the invention, the various phases of the operational process are:
- selection of the memory M1, M2, M3 or M4 by the simulator 1 via the control cable 24 and the means 10 and 8;
- switching on the hardware unit 2;
- storing of the selection by the module 3 when switching on; and
- a normal read phase, identical to that existing for the standard modules (specific to a single type of aircraft).

Of course, the flight simulator 1 according to the invention may still operate with such standard modules. In this case, the control cable 24, which also exists on the simulator 1, as can be seen in FIG. 1, is connected to a specific standby outlet, since the standard modules do not have connection means 10 intended for transmitting selection signals.

The invention claimed is:

1. A flight simulator for a family of aircraft, the flight simulator comprising:
   a module that has a plurality of independent non-volatile memories, each storing a software program that is specific to a different one of the family of aircraft; and
   a computer, having a hardware unit common to the family of aircraft, that performs a flight simulation function for a specific one of the family of aircraft by selecting and executing a stored software program corresponding to the specific aircraft, wherein:
   the hardware unit comprises a central processing unit, a connector, and a housing that receives the module,
   the module comprises a connector for removably electrically and mechanically connecting the module to the hardware unit, via the connector of the hardware unit,
   the selected and executed software program is retrieved from the independent memory in which it is stored in accordance with a control signal emitted by the central processing unit of said hardware unit,
   the module comprises a selection section that selects the independent memory storing the selected software program so that the selected software program is retrieved from the selected independent memory in accordance with the control signal emitted by the central processing unit,
   the module connector corn rises a first connection section that cooperates with a first connection section of the hardware unit's connector for removably, electrically and mechanically connecting the module to the hardware unit so that the selected software program stored by the module is executed by the central processing unit,
   the module connector comprises a second connection section that cooperates with a second connection section of the hardware unit's connector so that the control signal emitted by the central processing unit is communicated to the module's selection section,
   the electrical power supply for the module is provided by the hardware unit via the hardware unit's first connection section and the module's first connection section,
   the family of aircraft is a set of aircraft of different types that comprises equipment that is identical for all aircraft of the family, and
   said module comprises a locking section that, upon applying power to the module, locks a first-received selection signal, provided by the hardware unit to identify the selected software program, before the hardware unit reads the selected software program so that any subsequently received selection signal does not affect which software program is executed.

2. The flight simulator as claimed in claim 1, wherein said locking section is inhibited upon receiving a signal emitted by a programming bench.

* * * * *